(12) United States Patent
Govorkov et al.

(10) Patent No.: US 7,088,450 B2
(45) Date of Patent: Aug. 8, 2006

(54) METHOD AND APPARATUS FOR MEASURING AMPLIFIED STIMULATED EMISSION IN THE OUTPUT OF A MASTER OSCILLATOR POWER AMPLIFIER SYSTEM

(75) Inventors: Sergei V. Govorkov, Boca Raton, FL (US); Tamas Nagy, Goettingen (DE); Gongxue Hua, Coral Springs, FL (US)

(73) Assignee: Coherent, Inc., Santa Clara, CA (US)

( * ) Notice: Subject to any disclaimer, the term of this patent is extended or adjusted under 35 U.S.C. 154(b) by 319 days.

(21) Appl. No.: 10/806,847

(22) Filed: Mar. 23, 2004

(65) Prior Publication Data

US 2004/0207853 A1    Oct. 21, 2004

Related U.S. Application Data

(60) Provisional application No. 60/460,108, filed on Apr. 3, 2003.

(51) Int. Cl.
*G01B 9/02* (2006.01)
(52) U.S. Cl. ........................... 356/450; 356/451
(58) Field of Classification Search ........ 356/450–456; 372/32
See application file for complete search history.

(56) References Cited

U.S. PATENT DOCUMENTS

| | | | |
|---|---|---|---|
| 5,559,815 A | 9/1996 | Berger et al. | |
| 6,240,110 B1 | 5/2001 | Ershov | |
| 6,243,405 B1 * | 6/2001 | Borneis et al. | 372/31 |
| 6,516,012 B1 * | 2/2003 | Kleinschmidt et al. | 372/32 |
| 6,549,555 B1 | 4/2003 | Serwazi et al. | |
| 6,567,450 B1 | 5/2003 | Myers et al. | |
| 6,590,922 B1 | 7/2003 | Onkels et al. | |
| 6,690,704 B1 | 2/2004 | Fallon et al. | |
| 6,747,741 B1 * | 6/2004 | Kleinschmidt | 356/454 |
| 2002/0071468 A1 | 6/2002 | Sandstrom et al. | |
| 2002/0154671 A1 | 10/2002 | Knowles et al. | |
| 2004/0141182 A1 * | 7/2004 | Schroder et al. | 356/454 |

* cited by examiner

*Primary Examiner*—Gregory J. Toatley, Jr.
*Assistant Examiner*—Patrick Connolly
(74) *Attorney, Agent, or Firm*—Stallman & Pollock LLP

(57) ABSTRACT

A method for measuring amplified spontaneous emission (ASE) content in a beam of laser radiation emitted by a laser master oscillator power-amplifier system comprises directing the beam of light into a two-beam interferometer having unequal beam path lengths. The two beams interfering in the interferometer have equal amplitude and form a pattern of interference fringes. The beam-path difference is arranged to be greater than the coherence length of the ASE so that the ASE content of the beam does not form interference fringes but provides a background level of light in the interference pattern. This enables the ASE content of the beam to be determined from measurements of the maximum intensity of a bright fringe and the minimum energy of a dark fringe in the interference pattern.

23 Claims, 7 Drawing Sheets

METHOD AND APPARATUS FOR MEASURING AMPLIFIED STIMULATED EMISSION IN THE OUTPUT OF A MASTER OSCILLATOR POWER AMPLIFIER SYSTEM

PRIORITY CLAIM

The present application claims priority to U.S. Provisional Patent Application Ser. No. 60/460,108, filed Apr. 3, 2003 the disclosure of which is incorporated in this document by reference.

TECHNICAL FIELD OF THE INVENTION

The present invention relates generally to ultraviolet (UV) optical lithography using a master oscillator power amplifier (MOPA) system including an excimer laser or molecular fluorine laser. The invention relates in particular to measurement of amplified spontaneous emission in the output of such a system.

DISCUSSION OF BACKGROUND ART

The spectral output of a MOPA system used for UV optical lithography includes a main emission "line" of laser radiation having a spectral width less than 1.0 picometers (pm) centered about a peak intensity wavelength and amplified spontaneous emission (ASE), having a spectral width between about 300 pm and 500 pm distributed about the peak intensity wavelength of the emission-line. The ASE has orders of magnitude lower intensity than the intensity of radiation in the main emission-line. In operations such as microlithography, suppression of total (wavelength integrated) ASE power below a few times 0.01% ($1 \times 10^{-4}$) the total power of the main emission-line energy is usually required. Because of this, measurement of ASE is important in determining whether or not the ASE is adequately suppressed.

Prior art methods of measuring ASE use a spectrometer to measure light intensity as a function of wavelength. One problem with using a spectrometer for ASE measurement is that light intensity is integrated over a wavelength band of about 10.0 pm around the peak emission wavelength ("in band" radiation), and integrated over the wavelength range of ASE outside of this 10 pm band. Since the integration range for ASE is usually at least 50 times the "in-band" integration range, for measuring integrated ASE of $1 \times 10^{-4}$ or less, the spectrometer must have a multi-channel detector having an amplitude resolution on the order of greater than $1 \times 10^6$ in order to provide adequate signal-to-noise ratio. Such multi-channel detectors are either not readily available, or prohibitively expensive.

Another problem with using a spectrometer for ASE measurement is that spectrometers have limited contrast when used for this purpose. This is because high intensity radiation of the main emission-line scatters randomly on various optical components inside the spectrometer, thus creating a broad background on the detector. This background light can be indistinguishable from the input ASE light. This problem is very difficult to overcome. There is a need for an ASE measurement scheme that does not require such an extremely sensitive detector and does not have a problem discriminating against background scattered light.

SUMMARY OF THE INVENTION

The present invention is directed to a method for measuring amplified spontaneous emission (ASE) content in a beam of light, the beam of light including a main-emission-line of amplified stimulated emission (laser radiation) together with the amplified spontaneous emission. In one aspect, the method comprises directing the beam of light into an interferometer arranged to direct first and second portions of the beam of light along first and second paths having a different length. The first and second beam portions are then combined on a common path such that the beam portions optically interfere with each other to provide an interference pattern of bright and dark fringes. The light intensity in one or more of the bright fringes and in one or more of the dark fringes is measured. The ASE content of the beam of light is determined from the bright and dark fringe intensity measurements.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the present invention.

DETAILED DESCRIPTION OF THE INVENTION

Figure 1:
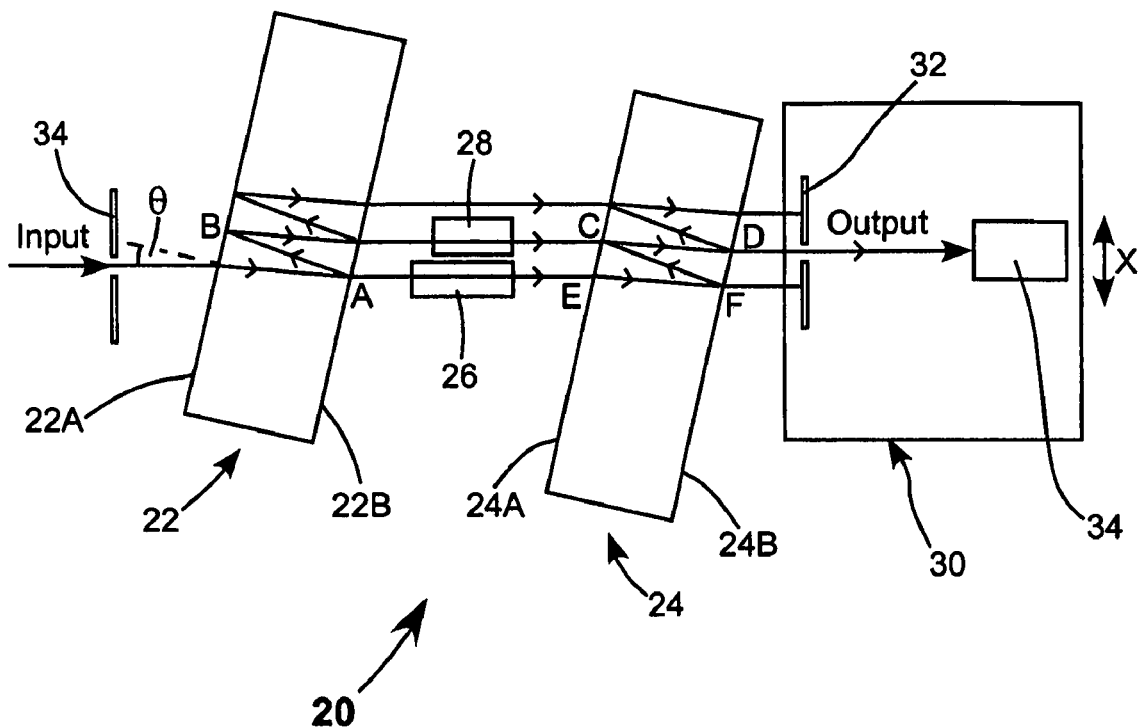
FIG. 1 schematically illustrates one preferred embodiment of apparatus for carrying out an ASE measurement method in accordance with the present invention, including an unequal path, two-beam interferometer of a modified Mach-Zender form and a photodetector and pinhole aperture for scanning an interference-fringe pattern produced by the interferometer.

Referring now to the drawings, wherein like components are designated by like reference numerals, FIG. 1 schematically illustrates one preferred embodiment 20 of interferometer apparatus for carrying out an ASE measurement method in accordance with the present invention. Interferometer 20 includes a transparent beamsplitter plate 22, having parallel opposite faces 22A and 22B, and a transparent beamsplitter plate 24 having parallel opposite faces 24A and 24B. Faces 22A and 22B and 24A and 24B are preferably uncoated. Beamsplitter plates 22 and 24 are arranged spaced apart and parallel to each other. Located between plates 22 and 24 is an optical delay element 26 and another optical delay element 28. Delay element 28 is shorter than delay element 26, and both of the delay elements are preferably uncoated. Mounted on a translation stage 30, movable in a direction indicated by double arrow X, are a detector 34 and a pinhole aperture 32 shielded the detector.

Detector 34, the material of the beamsplitter plates, and the material of the delay elements are selected according to the wavelength of light being measured. For light having a wavelength of about 193 nanometers (nm), calcium fluoride ($CaF_2$) is preferred as a material for beamsplitter plates 22 and 24 and delay elements 26 and 28. A preferred detector for the 193 nm-wavelength is a photodiode detector. One suitable photodiode detector is available from Hamamatsu Corporation of Bridgewater, N.J. A preferred thickness for beamsplitter plates 22 and 24 is about 9.0 mm and 18 mm.

An input beam is constrained by an aperture 34 to a size that allows clean separation of beams formed in the interferometer. Preferably aperture 34 has a diameter of about 1.0 mm and beam separation preferably is about 5.0 mm. Beamsplitter plates 22 and 24 are inclined to the input beam such that the beam is incident (in air) at an angle θ to surface 22A of beamsplitter plate 22. Angle θ is preferably between about 20° and 30° for plates having a thickness in the preferred range. The input beam includes a main emission-line content of amplified stimulated emission (laser radiation) and ASE.

The input beam traverses beamsplitter plate 22 and a portion thereof is reflected from surface 22B of the beamsplitter plate while the remainder is transmitted. The reflected portion (R), in the absence of a coating on the surface, will be determined by the refractive index of the material of the beamsplitter plate, the refractive index of the medium surrounding the plates (usually 1.0), the polarization of the input beams, and the angle of incidence of the beam on the surface. The remaining (transmitted) portion (T) of the beam is transmitted through surface 22B. Transmission T (of the surface) can be considered to be essentially equal to 1−R, the term "essentially", here meaning that any scattering at the surface is assumed to be sufficiently small to be negligible.

The reflected beam portion follows a first path through interferometer 20 traceable through points A, B, C, and D in sequence, and through aperture 32 to detector 34. Along this path, the reflection beam undergoes a second reflection at surface 22A of beamsplitter 22 followed by transmission through surface 22B of beamsplitter 22, transmission through delay element 28, and transmission through faces 24A and 24B of beamsplitter plate 24.

That portion of the input beam transmitted at point A follows a second path through interferometer 20 traceable through points A, E, F, C, and D in sequence and through aperture 32 to detector 34. Along this path, the reflection beam undergoes, in sequence, a transmission though delay element 26, a transmission at surface 24A of beamsplitter 24, a reflection from surface 24B of beamsplitter 24, another reflection from surface 24A of beamsplitter 24 and a transmission through surface 24B of beamsplitter plate 24.

The above-described first and second beam-paths are common from point C on surface 24A of beamsplitter 24 and accordingly, there is interference between the beams that have followed the separate paths into the common path, the beams being coincident spatially. As the beamsplitter plates are parallel, effects of low spatial coherence on the contrast of the resulting interference pattern are excluded. Further, both beams undergo exactly the same sequence of reflection and transmission events at the surfaces of the beamsplitter plates and traverse about the same thickness of optical material. This provides that the amplitudes of both beams are equal. The interference pattern is typically a series of dark and bright bands (interference fringes), since each of the beamsplitter plates is not perfectly plano-parallel. Having equal amplitudes in the two interfering beams provides that contrast between the bright and dark bands is maximized.

Figure 2:
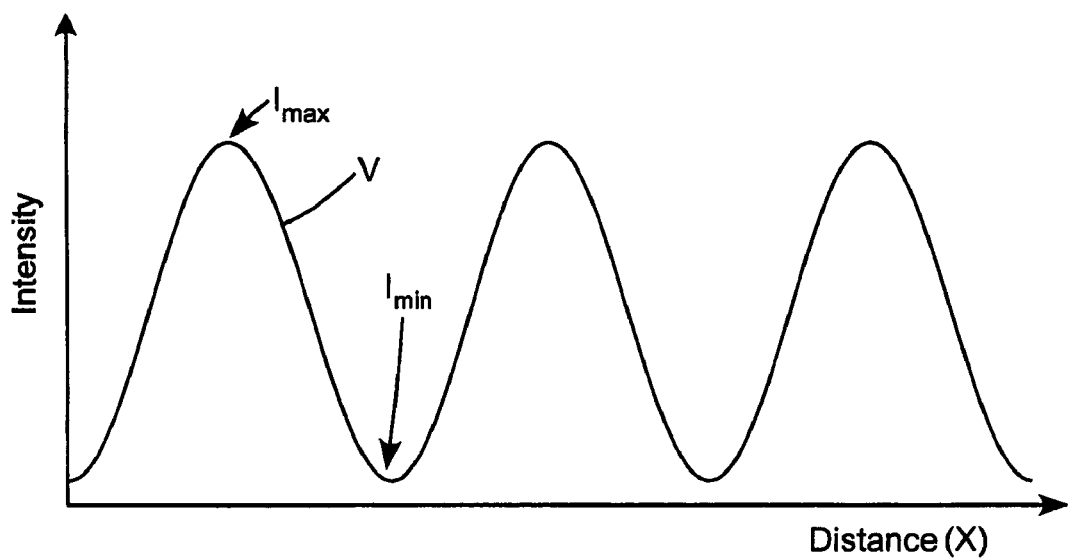
FIG. 2 is a graph schematically illustrating simulated output of the detector of FIG. 1 as the interference-fringe pattern is scanned.

The interference pattern is analyzed by scanning aperture 32 and associated detector 34 across the interference pattern by moving the translation stage in direction X. Aperture 32 preferably has a diameter between about 1.0 mm. The detector output as a function of scan distance is simulated schematically in graph form in FIG. 2. The output comprises a variable portion depicted by curve V, peaks and troughs of which graphically represent bright and dark fringes, respectively, of the interference pattern. Curve V has a peak intensity $I_{max}$ (maximum intensity in a bright fringe) and a minimum intensity $I_{min}$ (minimum intensity in a dark fringe). Value $I_{min}$ is exaggerated in FIG. 2 for purposes of illustration and in practice may be one or two orders of magnitude less than $I_{max}$. Scan distance is at least sufficient to include at lest one dark and one bright fringe, for example, about 1.0 mm.

There is a difference in path length between the interfering beams equal to the difference in optical length of delay elements 26 and 28. This difference is selected to be greater than the inverse spectral width of ASE in the input beam, i.e., greater than the coherence length of the ASE. This is orders of magnitude less than the coherence length (inverse spectral width) of light in the main emission-line of the input beam. A result of this is that the variable portion of the interference pattern represented by curve V is formed by wavelength components of the main emission-line, while wavelength components of the ASE can not interfere and consequently form a uniform background represented in FIG. 2 by $I_{min}$. Because of this, the contrast ratio of the interference pattern can serve as a measure of relative content of ASE in the output beam. A primary advantage of this inventive approach is that the determination of the level of ASE can be made without measuring the ASE spectroscopically, but rather in an integrated form. Besides having convenience of simpler measurement, this greatly reduces demands on the amplitude resolution of a detector used to make the measurement. A practical method of determining a suitable path difference is described further hereinbelow.

Before proceeding with a description of how the output of detector 34 is analyzed to provide an ASE measurement, it is useful to consider the usual parameters of an input beam to be analyzed, that is, the output or amplified output, of an excimer or molecular fluorine laser. Such a beam usually comprises a continuous sequence of radiation pulses delivered at a pulse repetition frequency (PRF) of between about 4.0 and 6.0 kilohertz (KHz). The pulses have a duration of about 20 nanoseconds. In the interfering beams there will two portions of a pulse separated in time by delay T determined by the difference in optical length of the two interferometer paths. Usually this path difference is not greater than about 0.5 mm, with $\tau$, correspondingly, being less than 2 picoseconds, i.e., about 0.0001 of the pulse width. Accordingly, the pulse portions can be considered as temporally as well as spatially overlapping.

Proceeding now with a description of a preferred analysis of the output of detector 34, it is assumed that each of the two beams in the common path of interferometer 20 has the same intensity I and consists of coherent and incoherent portions. Intensity I can be represented by an equation:

$$I = <(E_c(t)+E_i(t))(E_c(t)+E_i(t))^*> \quad (2)$$

where $E_c(t)$ and $E_i(t)$ are coherent and incoherent electric field components respectively as functions of time t, the asterisk denotes complex conjugate, and the triangular brackets denote time-averaging of the intensities of pulses in the sequence. The total intensity in the detector plane as a function of time delay $\tau$ between pulse portions in the two interference beams is given by an equation:

$$I_{det}(\tau) = <(E_c(t)+E_i(t)+E_c(t-\tau)+E_i(t-\tau))(E_c(t)+E_i(t)+E_c(t-\tau)E_i(t-\tau))^*> \quad (3)$$

Due to coherence properties of $E_c(t)$ and $E_i(t)$, the only non-zero terms in (3) are:

$$<E_i(t)E_i^*(t)> = I_i \quad (4)$$

$$<E_i(t-\tau)E_i^*(t-\tau)> = I_i \quad (5)$$

$$<E_c(t)E_c^*(t)> = I_c \quad (6)$$

$$<E_c(t-\tau)E_c^*(t-\tau)> = I_c \quad (7)$$

$$<E_c(t-\tau)E_c^*(t)+E_c(t)E_c^*(t-\tau)> = 2 I_c \cos(\omega\tau) \quad (8)$$

where $I_i$ is an incoherent (ASE) portion of the beam intensity, and $I_c$ is a coherent portion. Combining (2) with (3), (4), (5), (6), and (7) leads to the delay dependence of the detector signal:

$$I_{det}(\tau) = 2 I_i + 2 I_c(1+\cos(\omega\tau)) \quad (9)$$

where $\omega$ is the angular frequency of the light. In terms of the graph of FIG. 2, $I_{max}$ and $I_{min}$ correspond respectively to the maximum and minimum values of $I_{det}(\tau)$ in equation (8). Accordingly the contrast of the interference pattern analyzed by detector 34 is related to the "incoherent" content of the beam by an equation:

$$I_{max}/I_{min} = 1 + 2 I_c/I_i \quad (10)$$

from which the ratio of coherent (in band) and incoherent (ASE) can be determined. This means that in order to detect a level of ASE on the order of $1 \times 10^{-4}$ by the inventive method, a detector with a dynamic range of the same order is suitable. This is in contrast to the above-discussed prior-art spectroscopic measurement method, which requires a detector having about two orders of magnitude greater dynamic range, due to the need to integrate light over a relatively large region. A conventional UV photodetector of the type exemplified above can readily provide dynamic range of $10^{-4}$.

Figure 3:
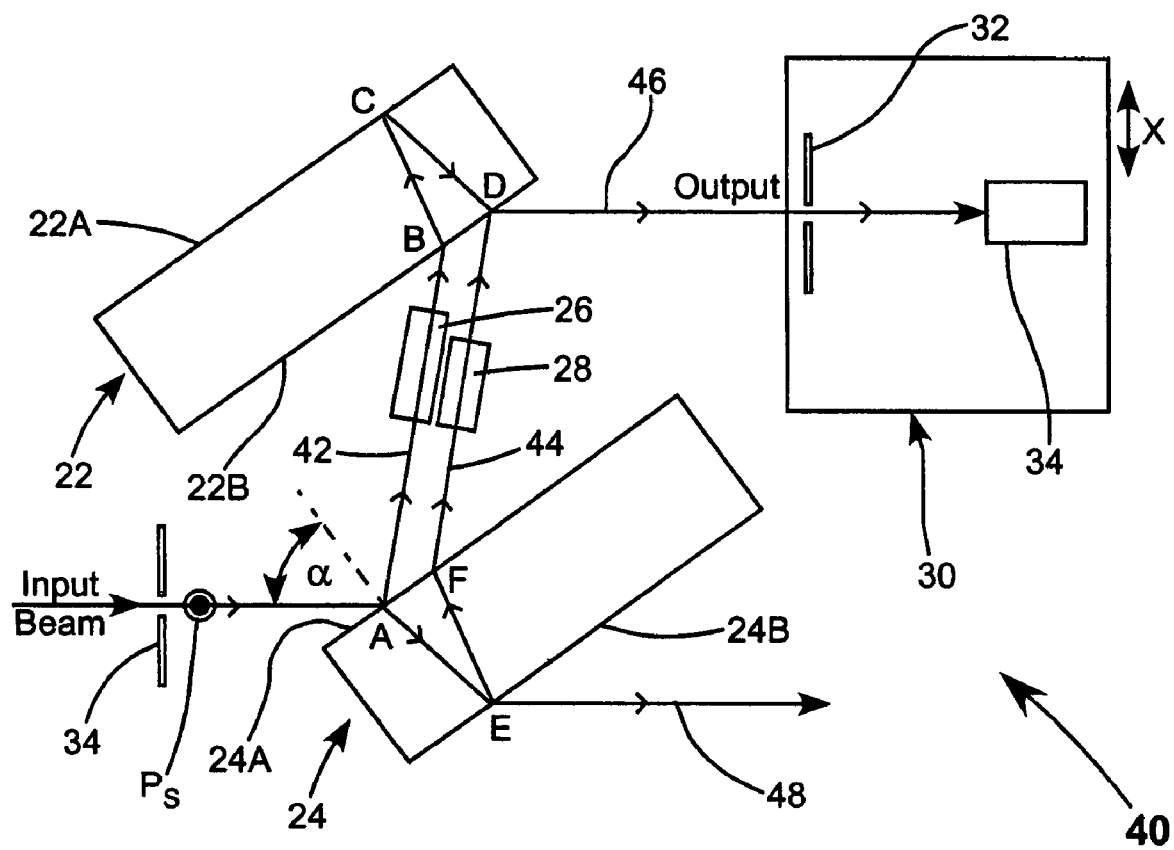
FIG. 3 schematically illustrates another preferred embodiment of apparatus for carrying out an ASE measurement method in accordance with the present invention, similar to the apparatus of FIG. 2 but including an unequal path, two-beam interferometer of a differently modified Mach-Zender form.

One shortcoming of above-described apparatus 20 is that if uncoated plates are used, the total transmission of the interferometer is relatively low. Uncoated surfaces are preferred, however, as this provides that light intensities in the two interfering beams are equal. FIG. 3 schematically illustrates another embodiment 40 of interferometer apparatus that provides increased transmission using beamsplitter plates 22 and 24 with uncoated surfaces, when the input beam is polarized perpendicular to the plane of the drawing as indicated by arrowhead $P_S$, i.e., perpendicularly-polarized (s-polarized) with respect to the plane of incidence of light on the beamsplitter plates. Interferometer 40 is similar to interferometer 20 with an exception that the beamsplitter plates are inclined at a greater angle to the input beam, and the input beam is incident first on surface 24A of beamsplitter 24. The input beam is incident on surface 24A at an angle $\alpha$ thereto where $\alpha$ is preferably 50° or greater.

A portion of the input beam is reflected from surface 24A of beamsplitter plate 24 and follows a first path 42 through interferometer 40 traceable through points A, B, C, and D in sequence and through aperture 32 to detector 34. Along this path the reflected beam portion undergoes, transmission through delay element 26, then a transmission at surface 22B of beamsplitter 22 followed by a reflection from surface 22A of beamsplitter 22, then a transmission through surface 22B of beamsplitter 22 onto a common beam path 46 through aperture 32 to detector 34.

That portion of the input beam transmitted at point A follows a second path 44 through interferometer 40, traceable through points A, E, F, and D in sequence and through aperture 32 to detector 34. Along this path the reflection beam undergoes, in sequence, a reflection from surface 24B of beamsplitter 24, a transmission through surface 24A of beamsplitter plate 24, a transmission though delay element 28, then a reflection from surface 22B of beamsplitter 22 onto common beam path 46. In common path 46, there is interference between the beams that have followed the separate paths 42 and 44 into the common path. Again, as the beamsplitter plates are parallel, effects of low spatial coherence on the contrast of the resulting interference pattern are excluded. As in interferometer 20, beams on paths 42 and 44 undergo exactly the same amount of reflection and transmission events at the surfaces of the beamsplitter plates, and traverse about the same thickness of optical material. This again provides that the amplitudes of both beams are equal.

Since the reflectivity of s-polarized light at a large angle, for example greater than 45°, can be more than twice the reflection at normal incidence, the total transmission of interferometer 40 is greater than that of interferometer 20. By way of example, if incidence angle $\alpha$ is equal to the Brewster angle of 56.3 degrees (for $CaF_2$ plates at wavelength of 193 nm), then the reflectivity of each surface is approximately 14.8%, and the total transmission of the interferometer is about 1.5%.

An additional advantage of this interferometer 40 is that the region of interference along path 46 is separated from the transmitted input beam, which exits the interferometer via surface 24B of beamsplitter plate 24 along path 48. This helps to improve contrast in the interference pattern of the interferometer. A possible disadvantage can be higher sensitivity of reflection coefficients of the beamsplitter plate faces to any contamination, oxidation, scatter, or the like at the faces.

It is important in interferometer 40 to have sufficiently high contrast in the interference pattern to achieve necessary intensity resolution. A primary source of reduced contrast is any inequality of the intensities of beams in paths 42 and 44 of the interferometer. Such inequality may arise from minute differences in reflectivity and scatter at different faces of beamsplitter plates 22 and 24 and of optical delay elements 26 and 28. In order to verify resolution of the interferometer, a calibration procedure is suggested as follows.

One of the delay elements, for example, delay element 26, is substituted by another delay element having the same length as the remaining delay element 28. This reduces the optical path difference in paths 42 and 44 essentially to zero. With a zero path difference in paths 42 and 44 all wavelength components within the entire spectral band of ASE will interfere. The actual bandwidth contributing to interference is limited by the manufacturing tolerance of the optical components, however, this zero path-difference interference should produce higher contrast than that with non-zero path-difference. At this point, the interferometer is aligned such that the measured contrast is maximized. This measured contrast then determines the intensity resolution of the system and serves as a baseline for the measurement with a specified optical path difference, as described above. As a cross check the calibration procedure can be repeated with delay element 28 substituted by an element of similar length to delay element 26.

Figure 4:
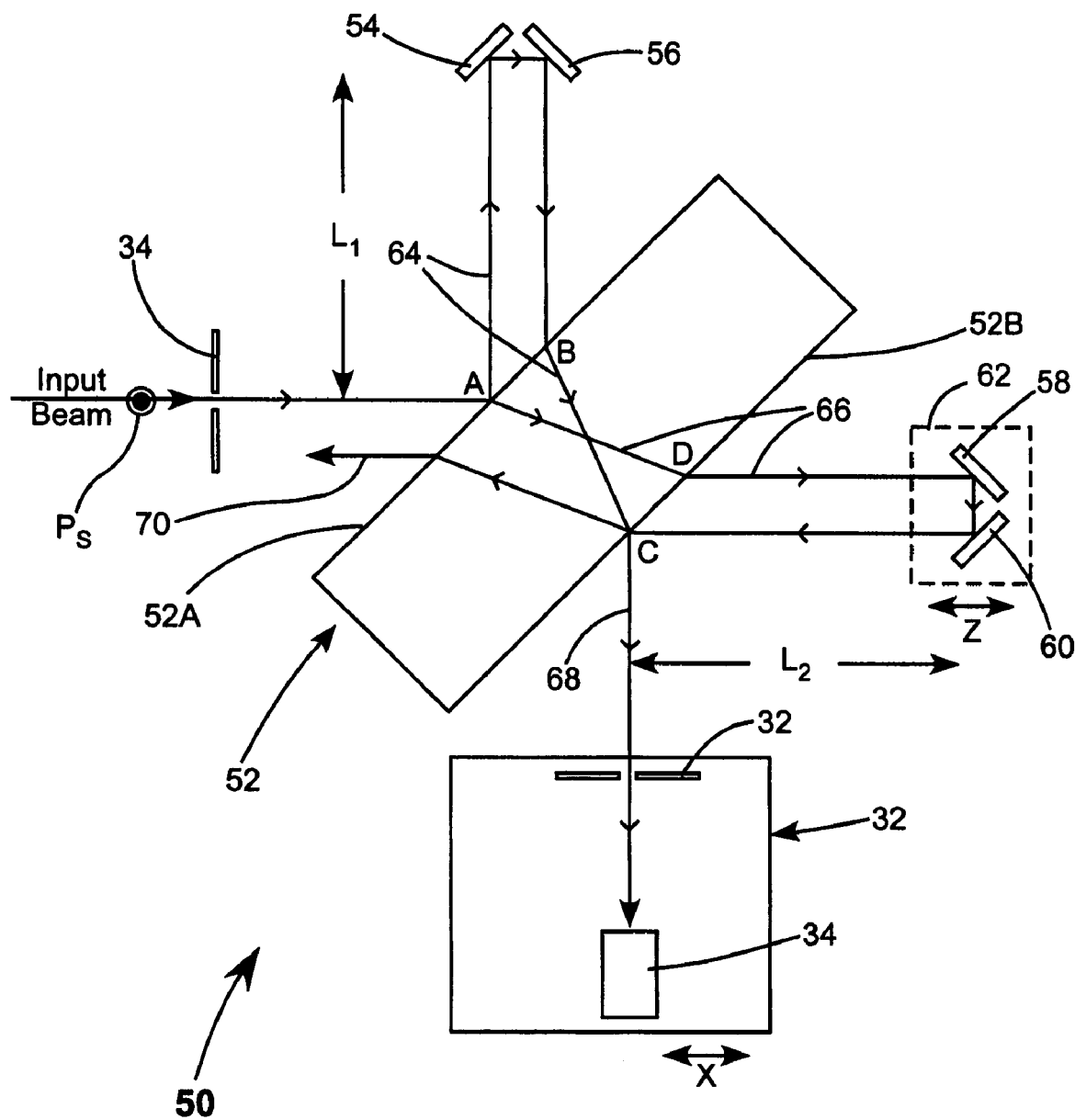
FIG. 4 schematically illustrates yet another preferred embodiment of apparatus for carrying out an ASE measurement method in accordance with the present invention including an unequal path, two-beam interferometer of a modified Michelson form, and a photodetector and pinhole aperture for scanning an interference-fringe pattern produced by the interferometer.

Referring now to FIG. 4 yet another embodiment 50 of interferometer apparatus in accordance with the present invention is in the form of a modified Michelson interferometer. Interferometer 50 includes a beamsplitter plate 52 having opposite, parallel, uncoated faces 52A and 52B. The beamsplitter plate is arranged at an angle of 45° to the input beam. Interferometer 50 further includes fully reflecting mirrors 54 and 56 inclined at 90° to each other and at 45° to the beam path, fully reflecting mirrors 58 and 60, also inclined at 90° to each other and at 45° to the beam path. Also included is a translation stage 30, movable in a direction indicated by double arrow X, having mounted thereon a detector 34 shielded by an aperture 32.

The input beam to interferometer 50 is s-polarized as discussed above with reference to interferometer 40. A portion of the input beam is reflected from surface 52A of beamsplitter plate 52 at point A thereon, and follows a first path 64 through interferometer 50 traceable through points A, B, and C to a (common) path 68 through aperture 32 to detector 34. Along this path, the reflected beam portion undergoes sequential reflections at mirrors 54 and 56, then sequential transmissions through faces 52A and 52B of beamsplitter plate 52 onto common path 68.

That portion of the input beam transmitted at point A follows a second path 66 through interferometer 50, traceable through points A, D, and C in sequence onto common path 68 through aperture 32 to detector 34. Along this path, the reflection beam undergoes, in sequence, sequential transmissions through faces 52A and 52B of beamsplitter plate 52, sequential reflections at mirrors 58 and 60, and then a reflection from surface 52B of beamsplitter plate 52 onto common path 68. In common path 46, there is interference between the beams that have followed the separate paths 64 and 66 into the common path. A remaining portion of the input beam exits interferometer via surface 52A of beamsplitter plate 52 out of the interferometer along a path 70.

An optical path difference is established between paths 64 and 66 by making the separation L1 of mirrors 54 and 56 from beamsplitter plate 52 greater or less than the separation L2 of mirrors 58 and 60 from beamsplitter plate 52. Preferably, the difference in optical paths is made adjustable, through zero, as indicated in FIG. 4 by mounting mirrors 58 and 60 on a translation stage movable as indicated by double arrow Z.

Beams interfering in path 68 are of equal amplitude, having undergone the same amount of reflection and transmission events and traversed an equal thickness of optical material. As discussed above, interference of the beams produces an interference pattern comprising a series or system interference fringes. The intensity Ip at any point P in the interference pattern can be defined by an equation:

$$I_p = I + I \cdot V(\tau, \Delta r) \cos(\phi(\tau, \Delta r)) \tag{11}$$

where, I is the input intensity, $\tau$ and $\Delta r$ are the temporal and spatial shifts between the two beams, respectively, and $\phi$ is the phase difference between the two beam paths. The fringe system can be defined as having a visibility V defined by an equation:

$$V(\tau, \Delta r) = \frac{I_{max} - I_{min}}{I_{max} + I_{min}} \tag{12}$$

where $I_{max}$ and $I_{min}$ are the maximum and minimum intensities of the observed fringes.

If the two interfering beams have complete spatial overlap in path 68, as is the desired case, spatial coherence does not play a role, and the visibility depends only on the time delay as follows:

$$V(\tau) = \left| \frac{\langle E(t+\tau) \cdot E^*(t) \rangle}{\langle E(t) \cdot E^*(t) \rangle} \right| \tag{13}$$

where E(t) is the complex electric field of the signal. Equation (13) indicates that the visibility is the normalized autocorrelation function of a signal which is related to the power spectrum of the signal by the Fourier transformation, according to the Wiener-Khintchine theorem:

$$\langle E(t+\tau) \cdot E^*(t) \rangle \Leftrightarrow E(\omega) \cdot E^*(\omega) \tag{14}$$

Accordingly, a visibility curve can be calculated from the spectrum by Fourier transformation. From the visibility curve the $I_{min}/I_{max}$ ratio can be defined by the following equation:

$$\frac{I_{min}}{I_{max}} = \frac{1 - V(\tau)}{1 + V(\tau)} \tag{15}$$

If the light is divided into completely coherent and incoherent parts, then the energy ratio of the incoherent part to the full signal can be defined by an equation:

$$\frac{E_{incoh}}{E_{tot}} = 2 \cdot \frac{I_{min}}{I_{max} + I_{min}} \tag{16}$$

Based on the foregoing theoretical analysis a model calculation was carried out, results of which are set forth below.

Figure 5:
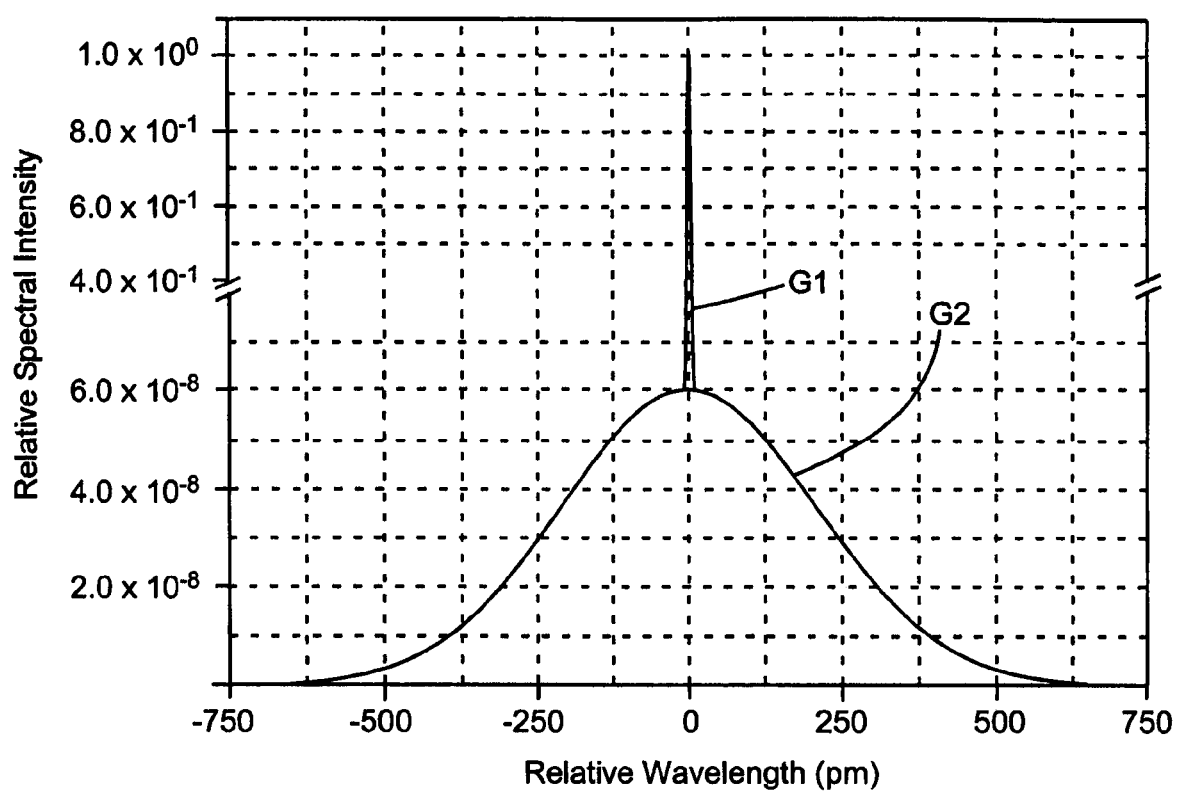
FIG. 5 is a graph schematically illustrating assumed intensity as a function of relative wavelength for in-band and ASE radiation to be measured in the interferometer apparatus of FIG. 4.

Referring now to FIG. 5 the visibility and the measurable incoherent energy content of both the total output of a MOPA (Master Oscillator Power Amplifier) system, comprising a narrow band signal portion representative of in-band radiation (indicated in FIG. 5 as curve G1) plus ASE (curve G2), and the pure narrow-band signal only were calculated and compared. The integrated ASE is assumed to be about $1 \times 10^{-4}$ of the total energy and the center wavelength (relative wavelength value 0.0 in FIG. 5) was assumed to be 193.6 nm. Here, it should be noted that even though the ASE is estimated at $1 \times 10^{-4}$, the peak intensity of ASE at any discrete wavelength in the ASE bandwidth is on the order of $10^{-8}$. This illustrates the above discussed difficulties of the prior-art spectroscopic measurement.

Properties of the pure signal and the ASE are summarized in Table 1.

TABLE 1

|  | Signal | ASE |
|---|---|---|
| Shape | Gaussian | Gaussian |
| Central wavelength ($\lambda_0$) | 193.6 nm | 193.6 nm |
| Bandwidth ($\Delta\lambda$, FWHM) | 0.3 pm | 500 pm |
| Coherence length ($L_{coh} = \lambda_0^2/\Delta\lambda$) | ~125 mm | ~0.075 mm |
| Energy contribution | $0.9999 E_{tot}$ | $10^{-4} E_{tot}$ |

Figure 6:
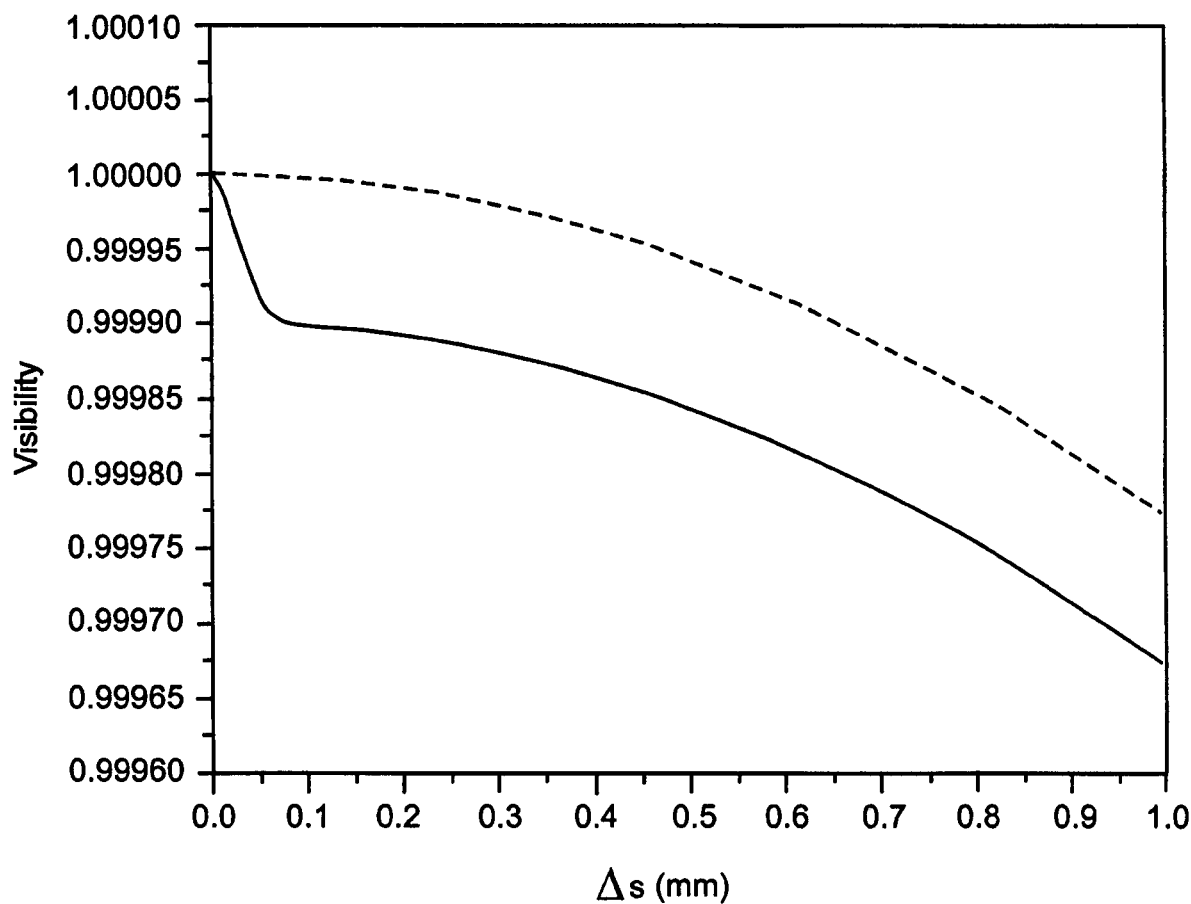
FIG. 6 is a graph schematically illustrating computed fringe visibility for in-band and total light as a function of beam-path difference in the apparatus of FIG. 4.
Figure 7:
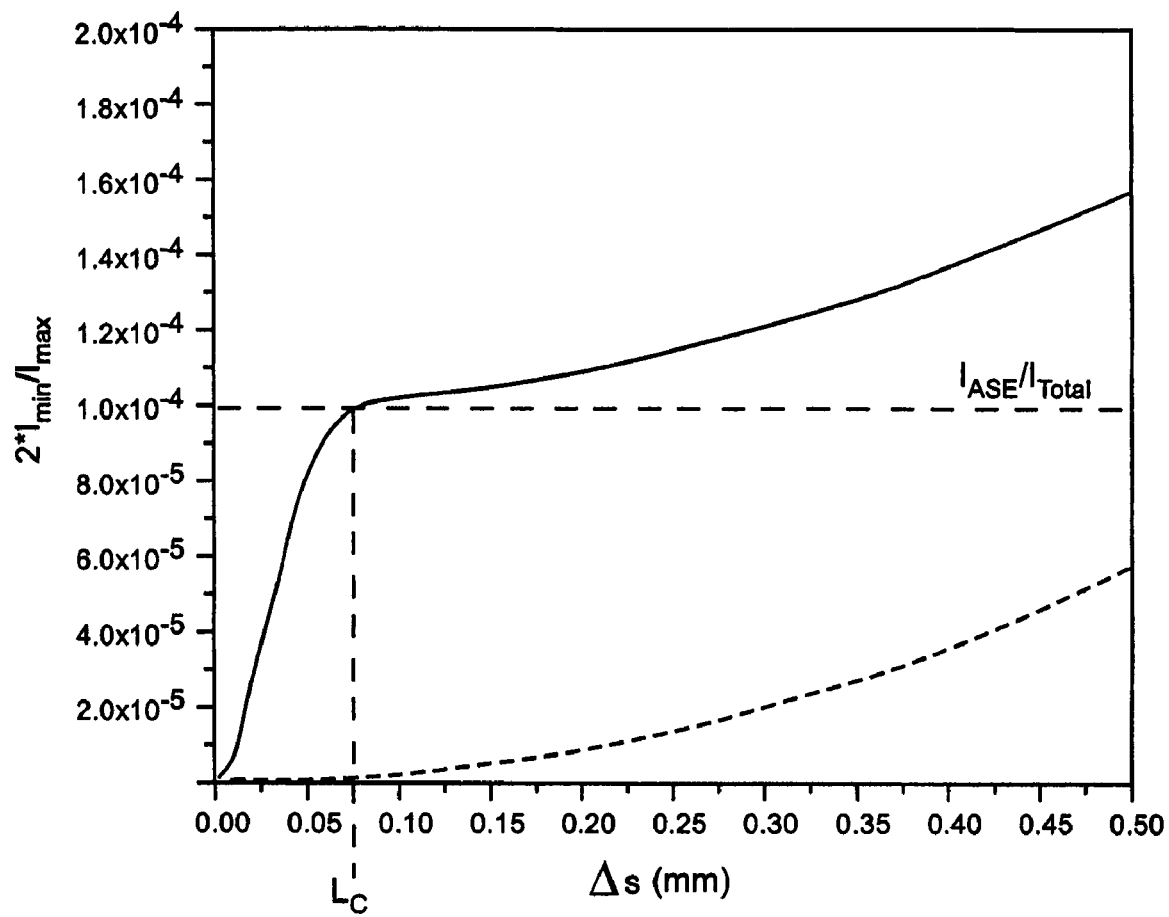
FIG. 7 is a graph schematically illustrating computed ratios of minimum to maximum intensity for fringe patterns of in-band and total light as a function of beam-path difference in the apparatus of FIG. 4.

FIG. 6 schematically depicts calculated fringe-pattern visibility as a function of optical path difference $\Delta s$ of the interfering beams for the signal plus ASE (solid curve) and for the signal only (dashed curve) This computation was made using equations (13) and (14). Path difference $\Delta s$ is equal to the time delay $\tau$ times the velocity of light. FIG. 7 schematically depicts calculated incoherent light energy content (ASE) as a function of optical path difference $\Delta s$ of the interfering beams for the signal plus ASE (solid curve) and for the signal only (dashed curve). This computation was made using equations (15) and (16).

In FIG. 6 it can be clearly seen that the small ASE content makes a relatively small and narrow tip on the visibility curve of the pure signal. The tip has a width about equal to coherence length of the ASE. FIG. 7 depicts the measurable quantity of the ASE component. The vertical distance between the solid and dashed curves in FIG. 7 is due to the ASE content that is to be measured. The calculation confirms the initially assumed value of $1 \times 10^{-4}$ for the ASE content. The curves also indicate that if only the composite signal is measured, then the precise value of the introduced delay between the interfering beams plays an important role. In order to measure the ASE content within 20% precision the delay $\Delta s$ is preferably between about equal to and four times the coherence length the ASE, i.e., between about $L_C$ and $4*L_C$, where $L_C$ is the coherence length of the ASE. From the above-discussed theory it also appears that it is not possible to choose a discrimination bandwidth, for example ±10 pm, because the discrimination is done by the shape difference of the two signals, noting that even that part of the ASE which is just below the signal's peak is counted into the ASE content.

Since the measurement precision sensitively depends on the applied delay and that the delay should be well matched to the spectral properties of the ASE, it is desirable to be able to change the delay of the interferometer. This is provided for in interferometer 50 by movable mirrors 58 and 60 on translation stage 62 (see FIG. 5) One preferred procedure for optimizing the ASE content measurement precision of interferometer 50 is set forth below First the optical paths 64 and 66 are equalized by inputting only ASE to the interferometer and then adjusting the position of mirrors 58 and 60 until maximum fringe contrast is obtained. Here, it should be noted that interference fringes will be only be formed when the path lengths of paths 64 and 68 are with about 50.0 micrometers (μm) of each other. This is because of the very short coherence length of the ASE.

Next the position of mirrors 58 and 60 is moved gradually until the interference fringes only just disappear ($\Delta s_{opt}$). This provides the minum delay necessary to eliminate the contribution of ASE to fringe contrast, thereby minimizing any delay contribution of the in-band light to reducing fringe contrast and optimizing the precision of the ASE energy content measurement. It is possible to gain further information on the measurement error by measuring the $I_{min}/I_{max}$ values of the total output of the MOPA system for 3–5 different delays between $\Delta s_{opt}$ and $4*\Delta s_{opt}$ and observing the systematic increase of the measured ASE values at delays longer than $\Delta s_{opt}$.

Modified Michelson interferometer 50 has a significantly higher transmission than interferometers 20 and 40. This is primarily because there is only one reflection (R) from an uncoated surface. The total transmission of the Michelson interferometer is $T^2R$. Where T is assumed be equal to $1-R$, as noted above, and reflection at mirrors 54, 56, 58, and 60 is assumed to be 100%. By way of comparison, the total transmissions of interferometers 20 and 40 are $T^4R^2$ or $T^2R^2$ respectively. Accordingly, in practical consideration the total transmission of interferometer 50 can be almost an order of magnitude greater than that of interferometer 40. TABLE 2 includes the results of a computation of the transmission for an interferometer 50 for in-band radiation and ASE ($T_{tot}$) and for ASE only ($T_{eff}ASE$) for perpendicular (s) and parallel (p) polarization. The values are for a $CaF_2$ beamsplitter plate 52 at 193 nm (refractive index=1.5019).

TABLE 2

|  | s-polarization | p-polarization |
|---|---|---|
| R | 9.25% | 0.85% |
| T | 90.75% | 99.15% |
| $T_{tot} = T^2R$ | 7.62% | 0.84% |
| $T_{eff}ASE$ | 4.23% |  |

The value $T_{tot}$ is lower than the value $T_{eff}ASE$ as ASE is essentially completely unpolarized while the in-band light is polarized. Accordingly, the overall transmission of the interferometer differs for the signal and for the ASE. With this in mind, an anlysis was made of the sensitivity of the ASE and measurement to variation in less-than-complete polarization of the in-band (signal) light. The results of this analysis are set forth below.

Assuming that light I in each beam path includes components in both parallel and perpendicular polarization then:

$$I = I_s + I_p \quad (17)$$

where $I_s$ and $I_p$ are the perpendicular and parallel components. The overall transmitted intensity $I^T$ can be defined by an equation:

$$I^T = T_s I_s + T_p I_p = T_{eff} I \quad (18)$$

In the case of a well-polarized signal, $T_{eff}$ is either $T_s$ or $T_p$. The ASE is unpolarized therefore $I_s = I_p = I/2$ which results in an effective overall transmission:

$$T_{e\!f\!f}^{ASE} = \frac{T_s + T_p}{2} \quad (19)$$

The above transmission difference has to be taken into account in equation (16) to gain correct results. Accordingly, a measured ratio incoherent (ASE) content can be defined by an equation:

$$\left(\frac{E_{incoh}}{E_{tot}}\right)_{mean} = 2 \cdot \frac{C_T I_{min}}{I_{max} + C_T I_{min}} \quad (20)$$

where  (21)

$$C_T = \frac{T_{e\!f\!f}^{signal}}{T_{e\!f\!f}^{ASE}}$$

The influence of the incomplete polarization of the narrow-band signal has to be also estimated, considering the partially polarized light of equation (17). Since both polarization components of the signal have the same bandwidth, they are coherent in the same extent (having the same visibility V(τ)) and equation (15) is applicable for both. On the other hand, the electric field vectors of s- and p-polarized light are perpendicular to each other, therefore they can not interfere with each other, and the output intensity ($I_{out}$) can be derived from the following chain of equality:

$$I_{out} = I_{s,out} + I_{p,out} = I_s + I_s \cdot V(\tau)\cos(\varphi(\tau)) + I_p + I_p \cdot V(\tau)\cos(\varphi(\tau)) = \quad (22)$$
$$(I_s + I_p) + (I_s + I_p) \cdot V(\tau)\cos(\varphi(\tau)) = I + I \cdot V(\tau)\cos(\varphi(\tau))$$

This indicates that the interference pattern is exactly the same for a partially polarized emission-line as that of a completely polarized emission-line having the same intensity. Accordingly, it appears that an incomplete polarization degree of the narrow-band signal would not have a significant influence on the precision of the inventive ASE measurement.

One limitation of the above-described embodiments of the present invention is that the maximum achievable contrast ratio in the interferometer can be reduced by any inequality of amplitudes of the two interfering beams, and also by scatter of stronger main emission-line radiation at the faces and in the bulk of the beamsplitter plate. This may result in a lower practical contrast ratio than would be expected from the above-discussed theory as represented by above-discussed equation (9). This can be phenomenologically explained by considering that in relying on equation (5), a value $I_{i\ apparent}$ is measured instead of $I_i$. The value $I_{i\ apparent}$ comprises two parts as follows:

$$I_{i\ apparent} = I_i + I_0, \quad (23)$$

where $I_i$ is the true incoherent content of the beam, and $I_0$ is due to scatter and other effects leading to a constant background of the interference pattern. Since $I_0$ can be quite large in comparison to $I_i$, the amplitude resolution of the device and method may be limited.

Figure 8:
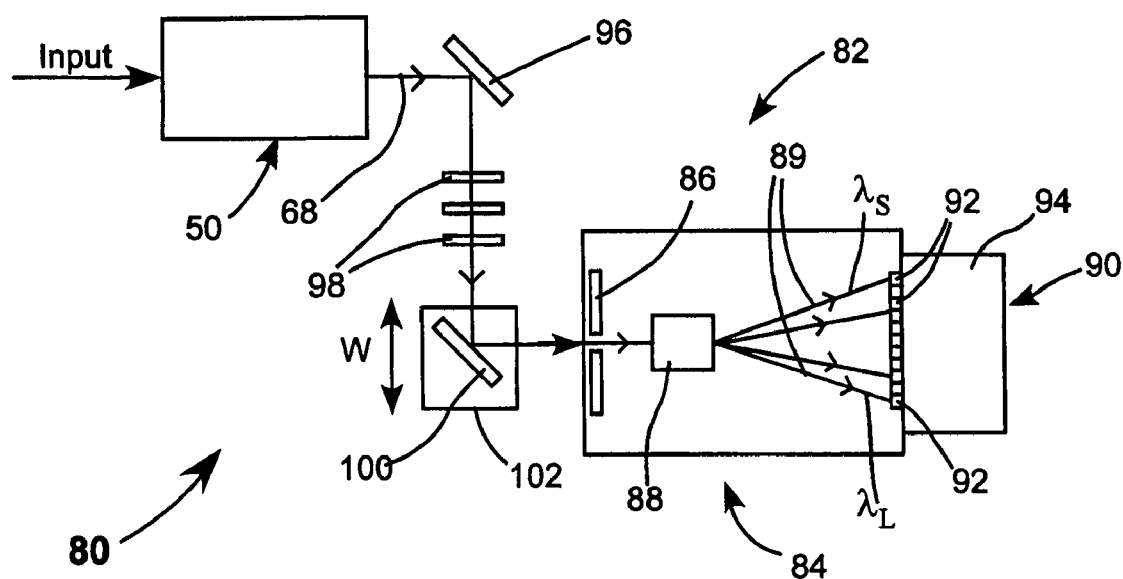
FIG. 8 schematically illustrates another embodiment of apparatus in accordance with the present invention including the interferometer of FIG. 4 and a spectrometer arranged to measure the intensity of light and dark fringes in an interference pattern produced by the interferometer.

FIG. 8 schematically illustrates an embodiment 80 of the present invention configured to mitigate the effect of constant backgound on the precision of the inventive ASE measurment method. Apparatus 20, includes two-beam interferometer 50 depicted as a single block. Interferometer 50 is chosen here, but the interferometer could be any other interferometer embodiment in accordance with the present invention. It should also be noted that whatever interferometer embodiment is selected, that interferometer, here, should not include a translation stage 30 and associated detector 34 (see FIG. 4). In place of detector 34, is an analysis apparatus 82.

Analysis apparatus 82 comprises a spectrometer 84. Spectrometers, and principles of operation thereof, are well known in the art to which the present invetion pertains. A description is provided, herein, only of those features of spectrometer 84 relevant to principles of the present invention.

Spectrometer 84 includes a slit aperture 86, a monochromator 88, and a multichannel detector 90. Monochromator 88 includes dispersive and other optical elements (not shown), usually including at least one diffraction grating. Detector 90 includes a linear array of discrete detector channels (pixels) 92. Usually there are at least 1024 such channels, and preferably about 4096 channels, although only a few are shown in FIG. 8 for convenience of illustration. Such detectors are available form Hamamatsu Corporation of Bridgewater, N.J. Electronic apparatus 94 processes the output of the detector channels.

The output beam of interferometer 50 on path 68 is directed by a mirror 96, optionally through one or more calibrated optical attenuators 98, and onto a mirror 100. Mirror 100 directs the interfering beams on path 68 through slit 86 of the spectrometer into monochromator 88. Monochromator 88, is arranged to disperse light in the beam into a continuous fan of rays 89, each thereof having a different direction and a different wavelength, the direction being determined by the wavelength of the ray. Only four rays are shown in FIG. 8, for simplicity of illlustration, with directions ranging for that of a shortest wavelength ($\lambda_S$) direction thereof to a longest wavelength direction ($\lambda_L$). The spectral width of each channel is determined by the difference between $\lambda_L$ and $\lambda_S$ divided by the number of channels covered by the fan of rays. Typically this spectral width per channel is on the order of a few picometers. Light of any or all wavelengths scattered (rather than properly dispersed) by components of monochromator 88 can be intercepted by any or all of the detectors, thereby creating a background level from which the ASE must be distinguished.

This limited spectral width of each channel, together with the path difference introduced by interferometer 50 between the two components of the interfering beams allows the spectrophotometer to be used to analyze beam 68 and, from the analysis, to determine the ASE content of beam 68. Further, the analysis can distinguish the ASE from light scattered by optical components of the spectrometer and from the contrast-reducing main-emission line light in the dark fringes of the fringe pattern produced by interferometer 50.

As a first step in the analysis, the maximum intensity of the main emission-line $I_{main\ line}$ is determined. This occurs when slit 86 is aligned (by moving mirror 100 on translation stage 102 as indicated by arrows W) with the center of a "bright" fringe in the interference pattern. If necessary, calibrated optical attenuators 98 (for example, neutral density filters) keep the light intensity on detector 90 within the dynamic range of the detector.

Next, any attenuators 98 that were used in the prior step are removed, and aperture 86 is aligned with the center of a "dark" fringe of the interference pattern by translating mirror 100 as indicated. Here, the intensity of the main emission-line ($I_{main\ line}$) is reduced by several orders of magnitude due to destructive interference thereof in interferometer 50. This minimizes broad background due to scatter inside the spectrometer. As a result of above-discussed practical difficulties in achieving exact equality between amplitudes of interfering beams in interferometer 50, this main emission-line light is not reduced to zero amplitude.

Figure 9:
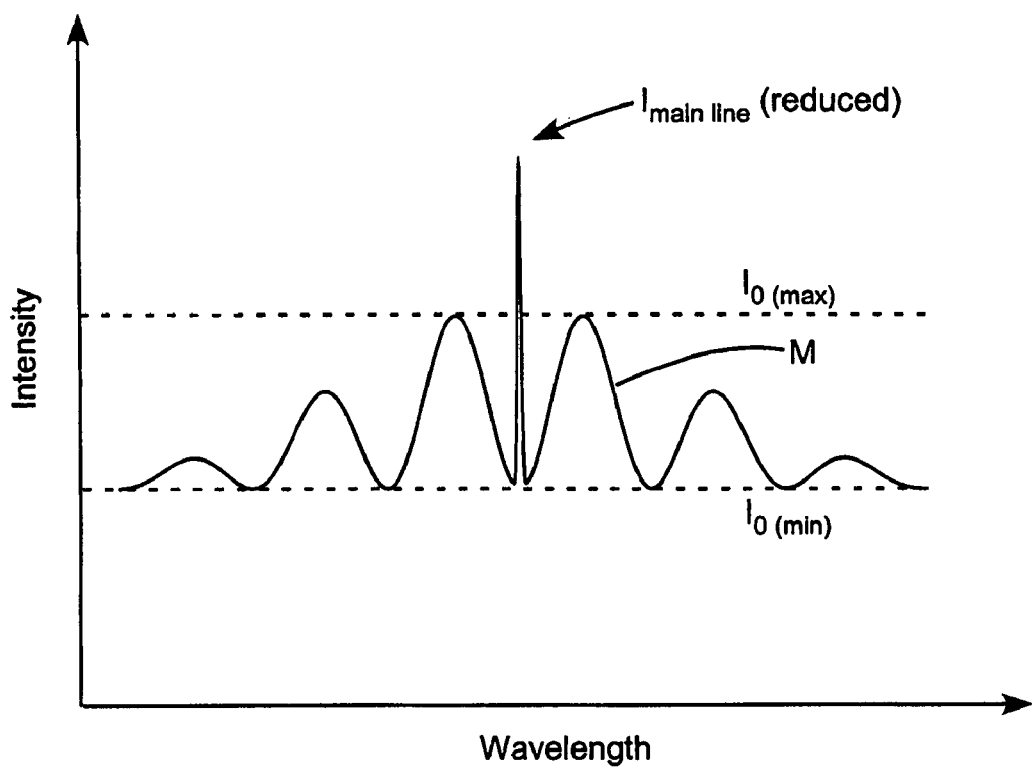
FIG. 9 is a representation in graph form of a spectrum of a dark fringe of the interference pattern produced by the interferometer of FIG. 8 measured by the spectrometer of FIG. 8.

A spectrum (intensity as a function of wavelength) detected by multi-channel detector 88, would appear as schematically illustrated in FIG. 9. The spectrum includes a smoothly varying modulated portion (curve M) and a uniform background portion having measured (apparent) intensity $I_{0(min)}$. Residual main emission-line light reduced in intensity by destructive interference in interferometer 50, appears as a residual narrow peak superimposed on the modulated portion M. The maximum measured (apparent) intensity of the remainder (smoothly varying portion) of modulated portion M has an intensity $I_{0(max)}$.

The modulation occurs because along any direction of light leaving monochrometer 88, there is only light of the wavelength to which that direction corresponds. Accordingly, the light is coherent. There are two components of that light having a phase difference therebetween corresponding to the path-difference delay $\tau$ between beams in interferometer 50. Those components will interfere constructively or destructively to an extent dependent on this phase difference. Each detector channel 92 detects a light intensity dependent on $\tau$ and the average frequency of light in that channel. Each channel 92 is read by electronics 94 providing the spectrum of FIG. 9, including a modulated portion M. The modulation period of portion M is inversely proportional to delay $\tau$.

It is emphasized here that in order for modulated portion M to be detectable in the output of the spectrometer, i.e., in order for the ASE to be periodically modulated at all, there must be a path difference (delay $\tau$) between the interfering beams in interferometer 50. It is important that this path difference is greater than the coherence length of the ASE. If the path difference is equal to the coherence length of the ASE there will be only one modulation cycle in curve M, which may be insufficient modulation of curve M to be able to discriminate ASE from background. If the path difference is N times the coherence length of the ASE there will be N modulation cycles. If N is too, large there may be too many modulation cycles for the spectrometer to resolve. Preferably, the path difference is between about 4 and 6 times the coherence length of the ASE, consistent with the preferable path difference for optimum functioning of the interferometer.

Continuing with reference to FIG. 9, the apparent spectral intensity of the ASE is represented by the difference $I_{0(max)} - I_{0(min)}$. The un-modulated portion of the spectrum (measured as $I_{0(min)}$) is due to the scattered light inside the spectrometer, as discussed above. The true intensity of the ASE ($I_t$) can be defined by an equation $$I_t = \Delta\lambda_{ASE} * (I_{0(max)} - I_{0(min)}) \quad (24)$$

where $\Delta\lambda_{ASE}$ is the spectral width of ASE as measured from the spectrum. The (scattered) portion of the main emission-line light that did not produce interference fringes in the interferometer is added to the previously determined intensity of the main emission-line. Since this portion of the main emission-line is only a small portion of the total intensity of the main emission-line, it does not affect the accuracy of measurement.

The ratio of ASE intensity to the main line intensity can now be calculated from an equation:

$$I_t/I_c = (\Delta\lambda_{ASE} * (I_{0(max)} - I_{0(min)}))/(\Delta\lambda_{main\ line} * I_{main\ line}) \quad (25)$$

where $\Delta\lambda_{main\ line}$ is the spectral width of the main line as it appears on detector 88.

The present invention is described above in terms of a preferred and other embodiments. The invention is not limited, however, to the embodiments described and depicted. Rather, the invention is limited by the claims appended hereto.

The following patents and patent applications provide background information and are incorporated herein by reference: U.S. Pat. Nos. 5,559,815; 6,549,555; 6,590,922; 6,690,704; 6,567,450; 6,240,110; and U.S. patent application Ser. Nos. 2002/0154671 and 2002/0071468.

What is claimed is:

1. A method for measuring amplified spontaneous emission (ASE) content in a beam of light, the beam of light including a main-emission-line of amplified stimulated emission together with the amplified spontaneous emission, the method comprising the steps of:
   directing the beam of light into an interferometer;
   in the interferometer, directing first and second portions of the beam of light along first and second paths, said first and second paths having a different length;
   combining said first and second portions of the beam of light from said first and second paths on a third path such that said beam portions interfere to provide interference pattern comprising bright and dark fringes;
   measuring the light intensity of one or more of said bright fringes and in one or more of said dark fringes; and
   determining from said bright and dark fringe intensity measurements the ASE content of the beam of light.

2. The method of claim 1, wherein said first and second beam portions interfering on said third path have about equal amplitude.

3. The method of claim 1, wherein said difference in length of said first and second paths is about equal to or greater than the coherence length of the ASE.

4. The method of claim 3, wherein said difference in length of said first and second paths is between about equal to and four times the coherence length the ASE.

5. The method of claim 1, wherein a said dark fringe has a measured minimum intensity $I_{min}$ and a said bright fringe has a measured intensity $I_{max}$, and said ASE content is determined from an equation $$E_{incoh}/E_{tot} = 2 \cdot I_{min}/(I_{max} + I_{min})$$

where $E_{incoh}/E_{tot}$ is the ratio of the ASE light content to total light in the beam of light.

6. The method of claim 1, wherein said measuring step includes providing a spectrometer, measuring in said spectrometer the maximum intensity of a said bright fringe and determining from said measurement the intensity of said light in said main emission-line, forming in said spectrophotometer a spectrum of light in a said dark fringe, and determining from said spectrum determining the intensity of the ASE.

7. The method of claim 6, wherein said spectrum includes a background level including a smoothly varying modulated portion, said smoothly varying modulated portion resulting from said different path lengths in said interferometer and having a maximum intensity $I_{0(max)}$ and a minimum intensity $I_{0(min)}$ and the ASE is determined from an equation $$I_t = \Delta\lambda_{ASE} * (I_{0(max)} - I_{0(min)})$$

where $I_t$ is the ASE and $\Delta\lambda_{ASE}$ is the spectral width of the ASE.

8. A method for measuring amplified spontaneous emission (ASE) content in a beam of light, the beam of light including a main-emission-line light content of amplified stimulated emission together with the amplified spontaneous emission, the method comprising the steps of:
   directing the beam of light into an interferometer;
   in the interferometer, directing first and second portions of the beam of light along first and second paths, said first and second paths having a different length;
   combining said first and second portions of the beam of light from said first and second paths on a third path such that said beam portions interfere to provide interference pattern comprising bright and dark fringes;
   measuring, in a spectrometer the light intensity of one or more of said bright fringes and in one or more of said dark fringes;
   measuring in a spectrometer the maximum intensity of a said bright fringe and determining from said measurement the intensity of said light in said main emission-line; and
   forming in said spectrometer a spectrum of light in a said dark fringe, and determining from said spectrum determining the intensity of the ASE.

9. The method of claim 8, wherein said spectrum includes a background level including a smoothly varying modulated portion, said smoothly varying modulated portion resulting from said different path lengths in said interferometer, and having a maximum intensity $I_{0(max)}$ and a minimum intensity $I_{0(min)}$ and wherein the ASE is determined from an equation $$I_i = \Delta\lambda_{ASE} * (I_{0(max)} - I_{0(min)})$$

where $I_i$ is the ASE and $\Delta\lambda_{ASE}$ is the spectral width of the ASE.

10. Apparatus for measuring amplified spontaneous emission (ASE) content in a beam of light, the beam of light including a main emission-line of amplified stimulated emission together with the amplified spontaneous emission, the apparatus comprising:
   an interferometer, said interferometer arranged to direct first and second portions of the beam of light along first and second paths, said first and second paths having a different length, said difference in length of said first and second paths being about equal to or greater than the coherence length of the ASE, but less than the coherence length of light in said main emission-line;
   said interferometer further arranged to combine said first and second portions of the beam of light from said first and second paths on a third path wherein as a result of said beam path difference only the main emission-line light portion of said light beam portions interferes and provides an interference pattern comprising bright and dark fringes; and
   one of a detector and a spectrometer arranged to measuring the light intensity in one or more of said bright fringes and in one or more of said dark fringes.

11. The apparatus of claim 10, wherein said interferometer is further arranged such that said first and second beam portions interfering on said third path have about equal amplitude.

12. The apparatus of claim 10, wherein said difference in length of said first and second paths is between about equal to and four times the coherence length the ASE.

13. The apparatus of claim 10, wherein said interferometer includes first and second transparent plates arranged spaced apart and parallel to each other and inclined to the beam of light to be measured, each of said plates having first and second opposite parallel surfaces and wherein there are first and second optical delay elements disposed between said plates said first and second delay elements being in said first and second beam paths respectively, and said first delay element having a length different from the length of said second gain element for causing said first and second beam paths to have said different length.

14. The apparatus of claim 13, wherein said light beam is incident on said first plate, wherein, in said first path, light is transmitted through said second surface of said first plate, transmitted through said first delay element, transmitted through said first surface of said second plate, reflected from said second surface of said second plate, and reflected from said first surface of said second plate, and wherein, in said second path, light is reflected from said second surface of said first plate at a point thereon where said first-path light is transmitted therethrough, reflected from said first surface of said first plate, transmitted through said second surface of said first plate, transmitted through said second optical delay element and transmitted through said first surface of said second plate at a point thereon where said first-path light is reflected therefrom.

15. The apparatus of claim 14, wherein the light beam is incident on said first plate at an angle between about 20 degrees and 30 degrees.

16. The apparatus of claim 13, wherein said light beam is incident on said second plate, wherein, in said first path, light is transmitted through said first surface of said second plate, reflected from said second surface of said second plate, transmitted through said first surface of said second plate, transmitted through said first delay element, and reflected from said second surface of said first plate, and wherein, in said second path, light is reflected from said first surface of said second plate at a point thereon where said first-path light is transmitted therethrough, transmitted through said second delay element, transmitted through said second surface of said first plate, reflected from said first surface of said first plate, and transmitted through said second surface of said first plate at a point thereon where said first-path light is reflected therefrom.

17. The apparatus of claim 16, wherein the light beam is incident on said second plate at an angle greater than about 50 degrees.

18. The apparatus of claim 17, wherein said light beam is plane polarized, and wherein said plates are arranged such that the polarization plane of said light is perpendicular to the plane of incidence of light on said second plate.

19. The apparatus of claim 10, wherein said interferometer includes a transparent plate having first and second opposite parallel surfaces and inclined to the beam of light to be measured at an angle of about 45 degrees, first and second mirrors inclined at 90 degrees to each other an disposed in said first path inclined at 45 degrees thereto, on said first-surface side of said plate at a first distance therefrom, and third and fourth mirrors inclined at 90 degrees to each other an disposed in said second path inclined at 45 degrees thereto on said second-surface side of said plate at a second distance therefrom, said first and second distances being different for creating said path length difference.

20. The apparatus of claim 19, wherein said light beam is incident on said first surface of said plate at an angle of 45 degrees thereto, wherein, in said first path, light is reflected from said first surface of said plate, reflected sequentially from said first and second mirrors, transmitted through said first surface of said plate and transmitted through said second surface of said plate and wherein in said second path, light is transmitted through said first surface of said plate at a point thereon where said first-path light is reflected therefrom, transmitted through said second surface of said plate, reflected sequentially from said third and fourth mirrors and reflected from said second surface of said plate at a point thereon where said first-path light is transmitted therethrough.

21. The apparatus of claim 10, wherein a spectrometer is used to measure said light intensity in said light and dark fringes.

22. The apparatus of claim 21, wherein said dark fringe intensity measurement includes a spectrum of light in said dark fringe said spectrum including a smoothly modulated portion resulting from the beam path difference in the interferometer causing interference of the ASE content of the dark fringe light in the spectrometer, said smoothly modulated portion surmounting a uniform portion resulting from scattering in the spectrometer of residual main emission-line light content of the dark fringe light.

23. An apparatus for measuring amplified spontaneous emission (ASE) content in a beam of light, the beam of light including a main emission-line of amplified stimulated emission together with the amplified spontaneous emission, the apparatus comprising:

an interferometer, said interferometer arranged to direct first and second portions of the beam of light along first and second paths, said first and second paths having a different length, said difference in length of said first and second paths being about equal to or greater than the coherence length of the ASE, but less than the coherence length of light in said main emission-line;

said interferometer further arranged to combine said first and second portions of the beam of light from said first and second paths on a third path wherein as a result of said beam path difference only the main emission-line light portion of said light beam portions interferes and provides an interference pattern comprising bright and dark fringes;

a spectrometer arranged to measure the light intensity in one or more of said bright fringes and in one or more of said dark fringes; and said dark fringe intensity measurement includes a spectrum of light in said dark fringe said spectrum including a smoothly modulated portion resulting from the beam path difference in the interferometer causing interference of the ASE content of the dark fringe light in the spectrometer, said smoothly modulated portion surmounting a uniform portion resulting from scattering in the spectrometer of residual main emission-line light content of the dark fringe light.

* * * * *